UNITED STATES PATENT OFFICE.

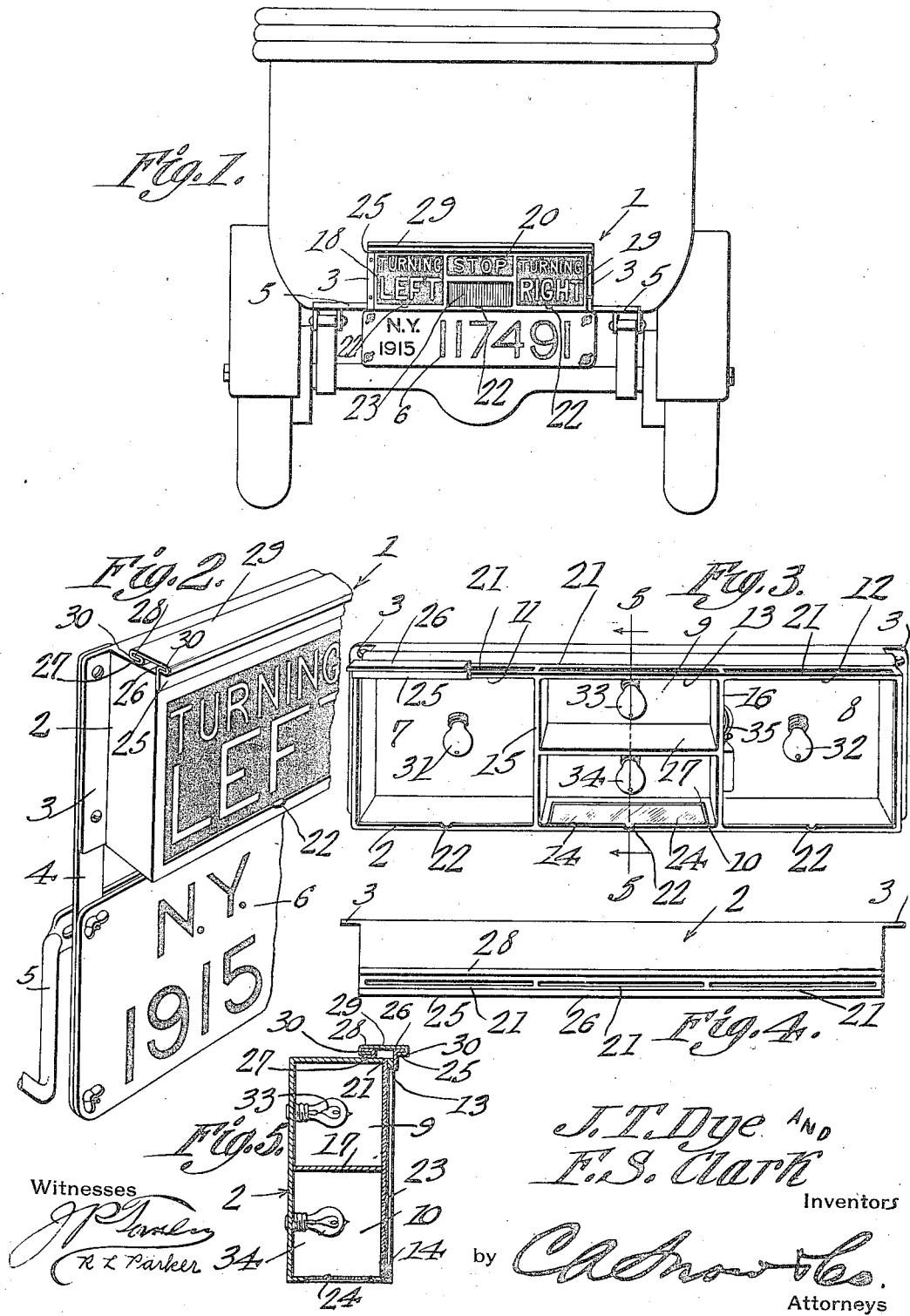

JAMES T. DYE AND FREDERICK S. CLARK, OF NEW YORK, N. Y.

AUTOMOBILE-SIGNAL.

1,211,115.  Specification of Letters Patent.  Patented Jan. 2, 1917.

Application filed August 4, 1915. Serial No. 43,660.

*To all whom it may concern:*

Be it known that we, JAMES T. DYE and FREDERICK S. CLARK, citizens of the United States, residing at New York, in the county of New York and State of New York, have invented a new and useful Automobile-Signal, of which the following is a specification.

The present invention is a signal or semaphore lamp adapted especially for use upon automobiles or motor vehicles, and so operable as to forewarn the traffic, especially in rear, of the intentions of the operator or driver to turn the machine to the right or left or to stop the same, in order that collisions and confusion will be avoided and to facilitate and control the traffic.

It is the object of the invention to provide a novel and improved appliance of the nature indicated, and which has improved features of construction to enhance the utility and efficiency thereof.

The invention embodies a signal or semaphore adapted to be carried by the rear end of a motor vehicle and embodying electric lamps, one of which serves as a tail light and the others being adapted to be lighted by suitable switches for indicating, through the medium of panels containing suitable legends, the intentions of the operator to turn in one direction or the other or to stop.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a rear end view of an automobile illustrating the signal applied thereto. Fig. 2 is a fragmental perspective view of the signal. Fig. 3 is a front perspective view of the casing with the panels removed. Fig. 4 is a top view of the signal casing with portions broken away. Fig. 5 is a sectional view taken on the line 5—5 of Fig. 3.

The apparatus includes a signal or semaphore 1 adapted to be carried by the rear end of an automobile or motor vehicle, as illustrated in Fig. 1. This signal 1 embodies a rectangular or elongated horizontal casing 2, constructed of sheet metal or any other suitable material, and the ends of the casing 2 are provided adjacent the back wall thereof with outstanding vertical flanges 3 secured by means of screws or other securing elements to vertical bars 4. These bars are in turn attached in any suitable manner to the bracket 5 carried by the automobile for the attachment thereof of the license number panel or plate, but in the present instance, the license number panel or plate 6 is attached to the bars 4 below the casing 2 approximately in the same vertical plane as the back wall of the casing. The casing 2 and panel 6 are attached to the bars 4 at one side thereof, and the opposite sides of the bars are secured to the bracket 5, the bars 4 being preferably supported adjustably by the bracket 5 in the manner that an ordinary license number panel is supported by the bracket.

The casing 2 is provided adjacent its left and right hand ends with chambers or compartments 7 and 8, and is provided between the chambers 7 and 8 with the superposed upper and lower central chambers or compartments 9 and 10, respectively. The said chambers all open forwardly, the front wall of the casing having the openings 11, 12, 13 and 14 for the respective chambers 7, 8, 9 and 10, and which openings are disposed in the same arrangement as the chambers. The openings are each slightly smaller, however, than the respective chamber. The casing has a vertical partition 15 therein separating the chamber 7 from the chambers 9 and 10, and is provided with a second vertical partition 16 separating the chamber 8 from the chambers 9 and 10. Between the partitions 15 and 16 is a horizontal partition 17 dividing the chambers 9 and 10. These partitions are opaque and prevent the penetration of the light therethrough from one chamber to the other as would be objectionable.

Disposed within the casing 2 adjacent the front wall thereof are three panels 18, 19 and 20. The left hand panel 18 stands across the opening 7 and is slightly larger than said opening to prevent the panel falling outwardly through said opening, and the right hand panel 19 likewise stands across and is larger than the opening 12. The central panel 20 stands across the openings 13 and 14 and is of larger area than the said openings 13 and 14 jointly. The left hand panel 18 is provided with the legend "Turning left," and the right hand panel 19 is provided with the legend "Turning right," while the central panel 20 is provided with the upper legend "Stop" to lie in front of the upper central chamber 9. The top of the casing 2 is provided adjacent the front wall with three longitudinal slots 21 through which the panels may be inserted into and withdrawn from the casing in applying and removing them, respectively. The panels 18, 19 and 20 may be of any suitable construction. For example, they may be in the form of stenciled sheet metal plates backed by glass of suitable color, or the panels may be of glass or other transparent material painted or otherwise finished to render portions thereof transparent and other portions opaque, so that the legends can be read, especially when light penetrates the panels from within the respective chambers of the casing. The central panel 20 is provided with a lower transparent portion 23 to lie in front of the lower central chamber 10, and this portion 23 is colored red, to indicate danger, the same as an ordinary red glass of a tail light.

The bottom of the casing 2, or the chamber 10 thereof, is provided with a transparent panel 24 permitting the light to pass from the chamber 10 through the panel 24 and against the face of the license number panel or plate 6 for illuminating the license number. When the license number panel is above the casing 2, the chamber 10 is above the chamber 9, and the panel 24 is at the top.

The front wall of the casing is provided with finger notches 22 at the lower ends of the openings 11, 12 and 14, whereby the panels 18, 19 and 20 may be lifted out through the slots 21 by inserting the finger in the notches 22 one at a time and then lifting the panels out of the casing.

Attached to the front upper corner of the casing 2 is a longitudinal angle iron 25 having a forwardly projecting flange 26 above the top of the casing, and a strip 27 of U-shaped section has one flange secured upon the top of the casing immediately in rear of the slots 21, and provides an upper rearwardly projecting flange 28 above the top of the casing. A longitudinal closure strip or plate 29 is slidable longitudinally or horizontally upon the flanges 26 and 28 and has downwardly reflected edges 30 to engage under the flanges 26 and 28 for holding the plate 29 upon said flanges, and to allow said plate to be slipped onto and off of said flanges in a longitudinal or horizontal direction only. When the plate 29 is applied it covers the slots 21, to prevent the removal of the panels 18, 19 and 20 until the plate 29 is removed, and the plate 29 also prevents rain, sleet and foreign matter from dropping down the slots 21 into the casing.

Electric lamps or bulbs 31, 32, 33 and 34 are disposed within the respective chambers 7, 8, 9 and 10, and are preferably attached to or engaged through the back wall of the casing centrally of said chambers. The lamps may be taken to typify any suitable means for producing a light or flash for signaling purposes. An electric bell or audible signal 35 is also disposed within the casing 2, within the chamber 8 as illustrated, and coöperates with the visual signals provided by the lamps, the lamps and bell being connected in suitable electric circuits (not shown) in order that the lamps can be properly lighted and the bell operated.

Having thus described the invention, what is claimed as new is:

A signal for vehicles, comprising a casing having a chamber, an opening in its front wall smaller than said chamber, and a slot in its top adjacent said front wall, a panel within the casing behind said front wall extending across said opening and within said slot, a lamp within said chamber, an angle member attached to said front wall at the front upper corner of the casing and having a forwardly projecting flange above the top of the casing, a strip of U-shaped section having one flange secured upon the top of the casing immediately in rear of said slot and having an upper rearwardly projecting flange above the top of the casing, and a cover plate slidable longitudinally upon said flanges and having reflexed edges engageable under the same.

In testimony that we claim the foregoing as our own, we have hereto affixed our signatures in the presence of two witnesses.

JAMES T. DYE.
FRED. S. CLARK.

Witnesses:
LUCINDA HORSTMANN,
F. J. BREEN.